US011263647B2

(12) United States Patent
Lee

(10) Patent No.: US 11,263,647 B2
(45) Date of Patent: Mar. 1, 2022

(54) METHOD, MANAGEMENT SERVER AND COMPUTER READABLE RECORDING MEDIUM FOR MANAGING A CUSTOMER RELATIONSHIP

(71) Applicant: NAVER Corporation, Seongnam-si (KR)

(72) Inventor: Yung Seong Lee, Seongnam-si (KR)

(73) Assignee: NAVER CORPORATION, Seongnam-si (KR)

(*) Notice: Subject to any disclaimer, the term of this patent is extended or adjusted under 35 U.S.C. 154(b) by 950 days.

(21) Appl. No.: 14/753,222

(22) Filed: Jun. 29, 2015

(65) Prior Publication Data
US 2015/0302431 A1 Oct. 22, 2015

Related U.S. Application Data

(62) Division of application No. 13/535,569, filed on Jun. 28, 2012, now abandoned.

(30) Foreign Application Priority Data

Jun. 28, 2011 (KR) .................. 10-2011-0062736

(51) Int. Cl.
*G06Q 30/02* (2012.01)
*G06Q 50/00* (2012.01)

(52) U.S. Cl.
CPC ......... *G06Q 30/0201* (2013.01); *G06Q 30/02* (2013.01); *G06Q 50/01* (2013.01)

(58) Field of Classification Search
CPC .................. G06Q 30/0205; G06Q 30/0201
See application file for complete search history.

(56) References Cited

U.S. PATENT DOCUMENTS 7,526,762 B1 * 4/2009 Astala ................. G06F 8/33
709/203
7,580,699 B1 * 8/2009 Shaw ................. G06Q 20/102
455/410

(Continued)

FOREIGN PATENT DOCUMENTS

JP 2002-366627 12/2002
JP 2004-126794 4/2004

(Continued)

OTHER PUBLICATIONS

Minghui Shi et al., IEEE802.11 Roaming and Authentication in Wireless LAN/Cellular Mobile Networks, IEEE Wireless Communications • Aug. 2004, pp. 66-75 (Year: 2004).*

(Continued)

*Primary Examiner* — Andre D Boyce
(74) *Attorney, Agent, or Firm* — Greer, Burns & Crain, Ltd

(57) ABSTRACT

Disclosed herein is a method for managing customer relationship through multiplex-assigning password of access point. According to an exemplary embodiment of the present invention, a method for managing a customer relationship by a customer management server includes: receiving customer terminal information including customer terminal identification information and customer group identification information within a shop being transmitted by accessing the access points of a plurality of customer terminals; and setting the plurality of accessed customer terminals as the same group in customer groups within the same shop based on the received customer group identification information within a shop and storing the set group in customer information corresponding to the customer terminals included in the group as customer social information.

20 Claims, 6 Drawing Sheets

(56) References Cited

U.S. PATENT DOCUMENTS

| | | | | |
|---|---|---|---|---|
| 2002/0144144 A1* | 10/2002 | Weiss | ............... | H04L 9/321 |
| | | | | 726/15 |
| 2004/0176995 A1* | 9/2004 | Fusz | ............... | G06Q 30/02 |
| | | | | 705/7.32 |
| 2006/0056832 A1 | 3/2006 | Yamaguchi et al. | | |
| 2010/0312703 A1 | 12/2010 | Kulpati et al. | | |
| 2011/0040655 A1 | 2/2011 | Hendrickson | | |
| 2011/0106597 A1 | 5/2011 | Ferdman et al. | | |
| 2012/0066065 A1 | 3/2012 | Switzer | | |

FOREIGN PATENT DOCUMENTS

| | | |
|---|---|---|
| JP | 2004-229056 | 8/2004 |
| JP | 2004-280318 | 10/2004 |
| JP | 2004-326662 | 11/2004 |
| JP | 2005-107886 | 4/2005 |
| JP | 2006-113819 | 4/2006 |
| JP | 2006-301866 | 11/2006 |
| JP | 2009-205113 | 9/2009 |
| JP | 2009-265833 | 11/2009 |
| JP | 2010-170484 | 8/2010 |
| JP | 2011-053938 | 3/2011 |
| KR | 10-2002-0040164 A | 5/2002 |
| KR | 10-2011-0070287 A | 6/2011 |

OTHER PUBLICATIONS

YounSun Cho et al., Secure Access Control for Location-Based Applications in WLAN Systems, 2006 IEEE International Conference on Mobile Ad Hoc and Sensor Systems, pp. 852-857 (Year: 2006).*

Office Action issued in U.S. Appl. No. 13/535,569, dated Oct. 3, 2014.

Office Action issued in corresponding Japanese Patent Application No. 2012-137897, dated Dec. 1, 2015.

* cited by examiner

FIG. 5

| ACCESS TERMINAL | ACCESS TIME | ACCESS PASSWORD | INTERNET USE INFORMATION |
|---|---|---|---|
| A | 19:00 ~ | 1111 | www.aaa.com<br>www.bbb.co.kr |
| B | 19:10 ~ | 2222 | www.aaa.com |
| C | 19:30 ~ | 2222 | www.ccc.com |
| D | 19:45 ~ | 1111 | www.ddd.com<br>www.eee.co.kr<br>www.abc.net |
| E | 20:00 ~ | 1111 | www.bbb.co.kr |

FIG. 6

| CUSTOMER | ACTIVITY INFORMATION | SOCIAL INFORMATION | ORDER INFORMATION | INTERNET USE INFORMATION | ACTIVITY INDEX |
|---|---|---|---|---|---|
| A | TOTAL NUMBER OF VISITS : 8<br>RECENT VISIT DATE : 04.15 | GROUP A,<br>GROUP LEADER | MENU 1 : 1<br>MENU 2 : 5<br>MENU 3 : 2<br>MENU 4 : 3 | www.aaa.com<br>www.bbb.co.kr | 150 |
| B | TOTAL NUMBER OF VISITS : 2<br>RECENT VISIT DATE : 03.20 | GROUP B | MENU 2 : 5<br>MENU 4 : 2 | www.aaa.com | 20 |
| C | TOTAL NUMBER OF VISITS : 5<br>RECENT VISIT DATE : 04.12 | GROUP B,<br>GROUP LEADER | MENU 1 : 1<br>MENU 2 : 2<br>MENU 3 : 2<br>MENU 4 : 5 | www.ccc.com | 100 |
| D | TOTAL NUMBER OF VISITS : 1<br>FIRST VISIT | GROUP A | MENU 1 : 1<br>MENU 2 : 1<br>MENU 3 : 1 | www.ddd.com<br>www.eee.co.kr<br>www.abc.net | 10 |
| E | TOTAL NUMBER OF VISITS : 3<br>RECENT VISIT DATE : 04.15 | GROUP A | MENU 1 : 1<br>MENU 2 : 3<br>MENU 3 : 2 | www.bbb.co.kr | 50 |

METHOD, MANAGEMENT SERVER AND COMPUTER READABLE RECORDING MEDIUM FOR MANAGING A CUSTOMER RELATIONSHIP

CROSS-REFERENCE TO RELATED APPLICATIONS

This application is a divisional of U.S. application Ser. No. 13/535,569, filed on Jun. 28, 2012, now abandoned. This application claims priority from and the benefit of Korean Patent Application No. 10-2011-0062736, filed on Jun. 28, 2011, which is hereby incorporated by reference for all purposes as if fully set forth herein.

BACKGROUND

Field

Exemplary embodiments of the present invention relate to a method, a management server, and a computer readable recording medium for managing customer relationship through multiplex-assigning password of access point, and more particularly, to a method, a management server, and a computer readable recording medium for managing customer relationship through multiplex-assigning password of access point capable of identifying groups within a shop to which customers manipulating customer terminals belong based on passwords input at the access time of access points of the corresponding customer terminals and collecting customer information in response to the identified groups, by using access points in which passwords assigned for each table are set.

Discussion of the Background

Customer Relationship Management (CRM), which is a term indicating methodologies, software, and the like, allows enterprises to manage customer relationship. CRM means a customer centered management technique which indexes purchase related behaviors of customers by arranging and analyzing information on current customers and potential customers and converting the information into marketing information and develops, realizes, and modifies marketing programs based on the indexed behaviors.

The CRM type may be classified in various ways. Generally, the CRM type may be classified into strategy focused CRM, database focused CRM, analysis focused CRM, interface management focused CRM, personalization focused CRM, and the like.

Among the CRM types, in particular, the personalization focused CRM focuses how to make products, services, and compensation distinguishable, and the like, for each customer. This may optimally set quality of products or services that are provided to each individual and may expand a range of the providing target through a good circle.

Therefore, among the CRMs, in particular, the personalization focused CRM has a problem in that the customer information can be obtained using any method or any kind of high quality information about customers can be obtained.

Generally, each shop including existing restaurant businesses, and the like, has used issuance of membership cards, such as a mileage card, a discount card, and the like, cooperation with card companies and communication companies, and Internet marketing, in the marketing strategy and the customer management.

A technique of obtaining the customer information using a membership card is a technique that applies personal information of customers acquired at the time of issuing the membership card and purchase information acquired at the time of payment for a purchase of articles or a use of services using a membership card to the CRM. However, the techniques using the membership card need to perform separate membership subscription procedure and therefore, have a problem in that as only some active customers among all the customers are subscribed as members, the customer information is limited. In addition, when at least two customers visit a shop, even though customers use a membership card at the time of payment, the technique of utilizing the membership cannot acquire information about customers accompanied by the customers using the membership card. Further, since the customer information corresponding to the membership card can be recognized only at the time of payment, the technique using the membership cannot provide a customer-specific service when customers visit a shop.

In addition, in case of the Internet marketing, it is difficult to substantially reflect the technique of deriving on-line membership subscription using home pages of enterprises and applying personal information of customers acquired at the time of membership subscription to the CRM or purchase information of on-line members. Therefore, the Internet marketing has a problem in that only the use of event guide, coupon issuance, and the like, using e-mail, SMS, and the like, is made.

Recently, as portable electronic communication devices that can perform wireless data communications, such as smart phones, palmtops, PDAs, netbooks have been prevalently distributed, the use of wireless Internet using the portable electronic communication devices has been rapidly increased. In order to use the wireless Internet, customers need to subscribe in order to pay services for providers or need to use wireless data networks provided by mobile communication companies for payment. In connection with this, a new marketing technique using wireless Internet services has been proposed. "Sponsored Access' or 'Sponsored Wi-Fi' is a type of a business to business (B2B) win-win model and allows visiting customers to use wireless Internet services free of charge, instead of exposing a target advertisement to, as a target, customers visiting a specific shop serving free Internet. An advertiser may freely expose a desired main screen or contents to customers to expect an advertisement effect and customers may access wireless Internet free of charge. However, the sponsored Wi-Fi performs only the exposure of a general advertisement and cannot use the acquired customer information for marketing.

The above information disclosed in this Background section is only for enhancement of understanding of the background of the invention, and therefore, it may contain information that does not form any part of the prior art nor what the prior art ma suggest to a person of ordinary skill in the art.

SUMMARY

Accordingly, exemplary embodiments of the present invention provide a method, a management server, and a computer readable recording medium for managing customer relationship through multiplex-assigning password of access point capable of identifying groups within a shop to which customers manipulating customer terminals belong based on passwords of customer terminals and collecting in detail customer information by being connected with a POS terminal.

Exemplary embodiments of the present invention also provide a method, a management server, and a computer readable recording medium for managing customer relationship through multiplex-assigning password of access point capable of acquiring information on multiple customers using a wireless LAN among a party of customers visiting a shop.

Exemplary embodiments of the present invention also provide a method, a management server, and a computer readable recording medium for managing customer relationship through multiplex-assigning password of access point capable of proposing preemptive customized services according to types of customers by identifying customers before payment when customers visit a shop.

Exemplary embodiments of the present invention also provide a method, a management server, and a computer readable recording medium for managing customer relationship through multiplex-assigning password of access point capable of classifying a party of customers visiting a shop into the same friend group and selecting an opinion leader of the corresponding friend group and performing intensive marketing on the selected opinion leader as a target.

Additional features of the invention will be set forth in the description which follows, and in part will be apparent from the description, or may be learned by practice of the invention.

According to an aspect of the present invention, there is provided a method for managing a customer relationship by a customer management server, including; receiving customer terminal information including customer terminal identification information and customer group identification information within a shop being transmitted by the access points of a plurality of customer terminals; and setting a plurality of accessed customer terminals as the same group in customer groups within the same shop based on the received customer group identification information within a shop and storing the set group in customer information corresponding to the customer terminals included in the group as customer social information.

According to another aspect of the present invention, there is provided a customer management server performing a method for managing a customer relationship, the customer management server including: a storage device; and a customer information management unit configured to receive customer terminal information including customer terminal identification information and customer group identification information within a shop being transmitted by accessing the access points of a plurality of customer terminals, set the plurality of accessed customer terminals as the same group in customer groups within the same shop based on the received customer group identification information within a shop, and store on the storage device the set group in customer information corresponding to the customer terminals included in the group as customer social information.

BRIEF DESCRIPTION OF THE DRAWINGS

FIG. 5 is a diagram exemplarily showing an example of acquiring information on customer terminals accessing access points according to the exemplary embodiment of the present invention.

FIG. 6 is a diagram exemplarily showing an example of customer information stored in the customer management server according to the exemplary embodiment of the present invention.

DETAILED DESCRIPTION OF THE ILLUSTRATED EMBODIMENTS

Figure 1:
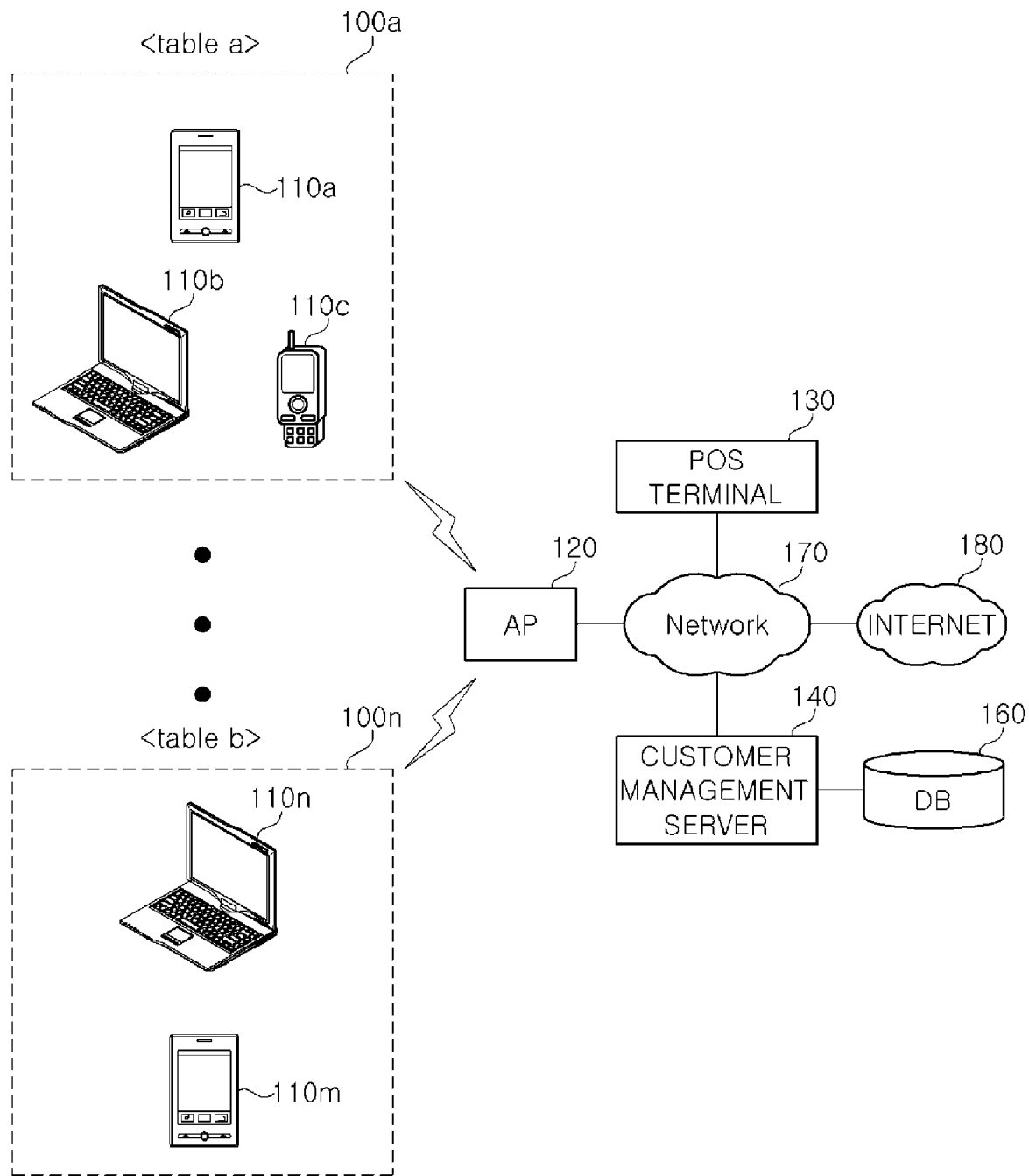
FIG. 1 is a diagram schematically showing an overall system configuration including access points and a customer management server according to an exemplary embodiment of the present invention.

Exemplary embodiments of the present invention will be described in detail with reference to the accompanying drawings. These embodiments will be described in detail for those skilled in the art in order to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents if appropriate. Similar reference numerals will be used to describe the same or similar functions throughout the accompanying drawing. In the drawings, like numbers refer to the same or similar functionality throughout the several views. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be described in detail with reference to the accompanying drawings so that those skilled in the art may easily practice the present invention.

Exemplary Embodiments of the Present Invention

In the exemplary embodiments of the present invention, the term "customer terminal identification information", which is unique information capable of identifying customer terminals, may be one of a product serial number, a media access control (MAC) address (a hardware address, an MAC address), and a telephone number, but is not limited thereto and is a concept including various types of information that can be acquired at an access point, as unique identification information of a terminal assigned to customer terminals.

Further, the term "customer groups within a shop", which is a concept meaning at least one customer visiting a shop, is a relative concept for identifying customer groups visiting a shop for each group within the present shop.

In addition, the term "customer terminal information", which is generated at access points and transmitted to a customer management server, means the customer terminal identification information, identification information of customer groups within a shop to which customers manipulating customer terminals belong, and information including the time during which the customer terminals access the access point, and the like.

Further, the term "customer information", which is all types of information collected about customers and stored in the customer management server, includes "activity information", "social information", and "activity score". The term "activity information" means information on a series of activities performed by customers, such as a visit history, a number of visits, an order history, and the like, of customers, the term 'activity score" means information numerically representing loyalty of customers calculated based on activity information of customers, and the term "social information" means information on relationship with other customers with which customers enters into a relation, Further, the term "unit business hour of table" means time during which customers stay in a specific table and is a relative time concept rather than an absolute time concept and is based on time when arrival and departure of a series of customers such as order time can be recognized, such as order time, time of payment, and the like In addition, the term 'customer index" means information numerically representing a business value of a party of customers visiting a shop and is information used as basic information that is calculated based on the number of identified customers belonging to the same table, the activity information of identified customers, the activity scores, and the like, to determine appropriate marketing solutions.

General System Configuration

FIG. 1 is a diagram schematically showing an overall system configuration including access points and a customer management server according to an exemplary embodiment of the present invention. Hereinafter, the overall system including the access points and the customer management server according to the exemplary embodiment of the present invention will be described with reference to FIG. 1.

As shown in FIG. 1, a system according to the exemplary embodiment of the present invention includes customer terminals 110, an access point 120, a point of sale (POS) terminal 130, a customer management server 140, and a network 170. The customer terminals 110 may include terminals 110a, 110b, 110c . . . 110m, and 110n.

First, the system according to the exemplary embodiment of the present invention is configured to provide passwords to customer groups visiting a shop operating the system so as to allow each of the visiting customer groups to use the access point 120 installed within a shop, thereby allowing customers belonging to each customer group to use Internet services. The password to the access point 120 for each customer group may be provided to the customer by two methods according to the configuration of the exemplary embodiment of the present invention. Specifically, a unique password of the access point 120 for each table is assigned to the table 100 within a shop and therefore, may be provided to a specific customer group within the shop. That is, the unique password of the access point 120 for each table such as password 1111 of No. 1 table, password 2222 of No. 2 table is assigned to each table within a shop and the customers access the access point 120 by using the password assigned to the table in which the customer groups are assigned. According to the exemplary embodiment of the present invention, the access point 120 is configured to identify a table (customer groups within a shop) to which the customers belong through passwords transmitted so as to allow the customer terminal 110 to access the access point 120. The unique passwords assigned to each table may be guided to the customers by various methods according to the exemplary embodiment of the present invention. According to the exemplary embodiment of the present invention, the unique passwords may be printed or manufactured as labels and thus, may be attached to the tables or articles kept in the tables. According to another exemplary embodiment of the present invention, the system may also be configured to include display units (not shown) in each table 100 and a use method and display the unique passwords assigned to the tables on the included display units. In such configuration, it is possible to easily guide changed passwords to customers when changing the passwords and expose information such as a menu guide, shop advertisement, and the like, to customers.

Meanwhile, according to another exemplary embodiment of the present invention, the system may also be configured to inform visiting customers of the password of the access point 120 when customers visit a shop and assign the password to the corresponding customers (groups). That is, the system may also be configured to provide passwords for each customer group so as to allow the customers visiting a shop to temporarily access the access point 120 without a need of assigning a unique password to each table. In this case, it may be determined that the customers accessing the access point 120 using the unique password for the same customer group are in the same group in the current shop. According to the exemplary embodiment of the present invention, the passwords of the access points provided to the customers may be generated in a POS terminal 130 when the customers visit a shop and is provided to the customers or one of the passwords for each group that are not currently used by other customer groups among the access passwords (for example, a scheme of assigning an access password 1111 to No. 1 visiting customer group and assigning an access password 2222 to No. 2 visiting customer group) for each of the previously set customer groups may be selected and provided to the customers.

In case one of the passwords for each of the previously set customer groups is provided to the customer groups visiting a shop, a plurality of passwords corresponding to the customer groups within a shop one-to-one are stored in the access point 120 and the access point 120 identifies the customer groups within a shop to which the corresponding customer terminal 110 belongs based on the password transmitted from the customer terminal 110 and transmits the identified customer group identification information within the shop to the customer management server 140.

When passwords for each customer group are generated by the POS terminal 130 in real time, passwords generated simultaneously with the generation of passwords for each customer group may be transmitted to the access point 120 and may be stored therein. For example, in case of a shop (a coffee bar) that allows customers to go to a counter within the shop and directly give an order, the POS terminal 130 may also be configured to generate passwords of access points assigned to each customer (group) based on a manipulation of a clerk (manager), output an order sheet including the generated passwords and an order history of customers, and provide the order sheet including the generated passwords to the corresponding customers by a clerk. Similarly, in case of a shop (restaurant, and the like) that allows a clerk to go to a table of a customer and get an order, the clerk has gone to tables of customers so as to get an order may also provide the passwords generated/output by the POS terminal to customers before the clerk gets an order or provide an order sheet on which passwords are printed to customers after the clerk gets an order. In addition, in case the password is not assigned to each table and therefore, the POS terminal 130 may be configured to generate customer table information or customer identification information capable of identifying customers together with passwords for each customer so as to be transmitted to the access point 120. In addition, the customer table information or the customer identification information that are generated is used to store the order/purchase information in connection with the customer information.

As described above, the system according to the exemplary embodiment of the present invention may be configured to identify the customer groups within a shop and then, use the customer group identification information within the identified shop (the table information if the passwords for each table is assigned, and the visiting customer group information if the passwords are assigned to each visiting customer group), based on passwords of access points configured to identify the customer groups visiting a shop.

Hereinafter, while the exemplary embodiment will be explained with regard to assigning unique passwords of access points for each table to each table within a shop for convenience of explanation, the technical gist of the present invention is that the password of the access point 120 is not assigned to the table but is generated for each customer and provided to customers. Also, it will be appreciated by those skilled in the art that the scope of the present invention covers such technical gist regardless of an exemplary embodiment about the gist.

The customer terminal 110 means a portable information communication device serving to use wireless Internet by accessing the access point 120 included within a shop based on a manipulation of customers, and includes a memory means such as a mobile communication terminal, and the like, including notebooks, palmtops, personal digital assistants (PDAs), netbooks, web pads, smart phones, and the like, and all the digital devices having operation ability by mounting a microprocessor therein may be adopted as the customer terminal 100. The customer terminal 110 searches and displays one or more available wireless networks provided by the access point 120 included in a shop based on the manipulation of the customers, and when the corresponding wireless network is selected, transmits an access request including passwords for each table input based on the manipulation of the customers to the access point 120 and accesses the access point 120.

The access point 120, which is a wireless access device for implementing wireless LAN environment, supports a wireless LAN (wireless fidelity (Wi-Fi)) according to IEEE 802.11 standard, but is not necessarily limited thereto. In addition, for convenience of explanation below, although the access point implemented as an independent device is described as an example, it would be appreciated by those skilled in the art that the same technical idea may be applied to various types of known devices that can perform a function of the access points.

The access point 120 serves to store unique passwords assigned to each table, identify the table to which the customer terminal 110 belong based on the password used when the customer terminal 110 accesses the access point 120, and generate the identified table information and the customer terminal identification information and the customer terminal information including the access time and transmit the generated information to the customer management server 140. A detailed configuration and function of the access point 120 according to the exemplary embodiment of the present invention will be described below.

Meanwhile, as described above, according to the exemplary embodiment configured so that the password of the access point 120 is assigned to each of the customer groups visiting the shop rather than being assigned to each table and is provided to the customer groups, the access point 120 serves to identify the visiting customer groups to which the customer terminal belongs by referring to the password table for the stored visiting customer groups and using the password used when the customers access the access point 120 and to generate the customer terminal information including the identified visiting customer group information (customer group identification information within a shop) and the customer terminal identification information and transmit the generated information to the customer management server 140.

The POS terminal 130 serves to transmit order information for each table based on the order of the customers and the payment information for each table based on the payment by the customers to the customer management server 140. Meanwhile, although not shown in FIG. 1, the system may further include a shop manager terminal that may control the setting and functions of the access point 120 and the customer management server 140 and receive and output the customer related information transmitted from the access point 120 and the customer management server 140. It would be appreciated by those skilled in the art that the shop manager terminal and the POS terminal 130 may be implemented in a single device.

The customer management server 140 is configured to be connected to the access point 120 and the POS terminal 130 through the network 170 to identify multiple customers belonging to the specific table using the customer terminal information transmitted from the access point 120, and collect the customer information and to link article/service purchase information such as order information, payment information, and the like, transmitted from the POS terminal 130 for the identified customers with the identified customer information and store it. In addition, the customer management server 140 is configured to identify a party of customers visiting a shop to classify and set the identified customers into the same friend group, thereby performing marketing based on the social relationship of the customers. The detailed configuration and function of the customer management server 140 will be described below with reference to FIG. 2.

Configuration of Access Point

First, a storage unit (not shown) configured as a storage medium such as a memory of the access point 120 stores the unique passwords assigned to each table within a shop. The access passwords for each table are stored in a table type and are referenced to determine password validity and identify the table to which the customer terminal 110 belongs when the customer terminal 100 accesses the access point. Meanwhile, the passwords for each table may be configured to be changed periodically or aperiodically so as to improve the security of the wireless network and prevent the wireless network from being abused and misused, and the access point 120 is configured to receive and update the changed passwords from a manager terminal (not shown), the POS terminal 130, or the customer management server 140 that are accessed by the highest manager authority.

An access point control unit (not shown) that generally controls the function of the access point 120 receives an access request from the customer terminal 110 and refers to the password table stored in the storage unit storing the password included in the access request to determine the validity, and if the password is valid, identifies the table to which the customer terminal 110 belongs. In addition, the access point control unit extracts the customer terminal identification information which identifies the customer terminal 110 such as a consecutive number of products of the accessed customer terminal 110, a MAC address, a telephone number, and the like, and transmits the extracted information to the customer management server 140, together with the table information, the access time information, and the like.

Meanwhile, the access point 120 may also be configured to use a multi service set identifier (SSID) function to provide separate wireless networks separated from each other for each table. That is, the access point 120 serves to provide the SSID of the wireless network set for each table such as XX coffee_table 1, XX coffee_table 2, . . . , XX coffee_table n, and the like, to the customer terminal 110 and select the SSID corresponding to the table with which the customer is associated and access the selected SSID. When the access point 120 is configured to provide the separated wireless network for each table, it is possible to improve the security.

In addition, the access point 120 may be configured to limit the maximum access customer terminals that can be simultaneously accessed with the same password so as to improve the security, and prevent the password from being abused and misused to reduce the likelihood of performance degradation caused by the increase in traffic. For example, when the number of maximum access customer terminals is set to be 3, if a fourth customer terminal 110 requests an access using the same password, the access point 120 transmits the guide information indicating that the access is not permitted due to the simultaneous access limitation to the customer terminal 110 and does not permit the access of the corresponding terminal.

On the other hand, while the exemplary embodiment of the present invention provided that the customer may access the access point 120 by inputting only the password assigned to the table of the access point 120, other exemplary embodiments may also be possible which allow collection of a customer telephone number through an authentication screen so as to more variously and efficiently collect the customer information. That is, the access point 120 provides the authentication screen which may prompt the customer to input a customer telephone number (corresponding to the ID) and password to the customer terminal 110 requesting an access, and receives and processes the input telephone number and password based on the manipulation of the customer. In the exemplary embodiment of the present invention, the access point 120 transmits the customer terminal information including the received customer telephone number to the customer management server 140. When the exemplary embodiment of the present invention is implemented as described above, the additional customer information can be obtained, and even if the customer replaces the customer terminal 110 and thus, the customer terminal identification information is changed, the customer can be identified by using the telephone number to enable continuous management by the customer.

On the other hand, the access point 120 may be configured to continuously monitor and store the Internet usage information of the accessed customer terminal 110, and when the access of the customer terminal 110 ends, to transmit the Internet usage information of the corresponding customer terminal to the customer management server 140. The Internet usage information which was transmitted to the customer management server 140 by the customer is stored in the customer information and is used as the basic information for establishing customer relationship management and marketing strategy.

Configuration of Customer Management Server

Figure 2:
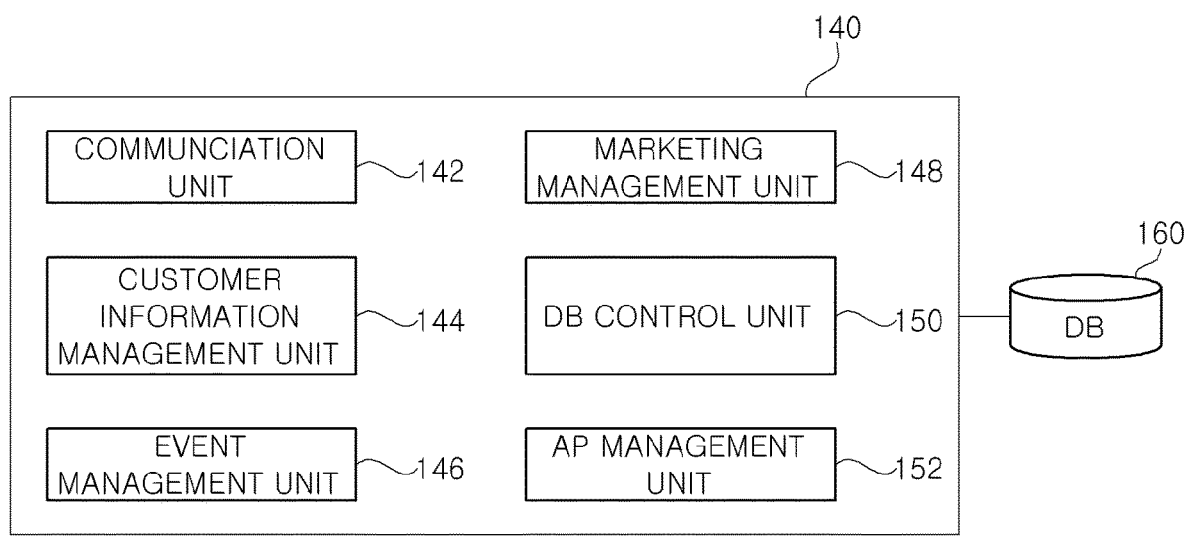
FIG. 2 is a diagram showing a detailed configuration of the customer management server according to the exemplary embodiment of the present invention.

FIG. 2 is a diagram showing a detailed configuration of the customer management server 140 according to the exemplary embodiment of the present invention. A detailed configuration and function of the customer management server 140 will be described with reference to FIG. 2.

As shown in FIG. 2, the customer management server 140 may include a communication unit 142, a customer information management unit 144, an event management unit 146, a marketing management unit 148, a database control unit 150, an access point management unit 152, and a database 160.

First, the database 160 connected to the customer management server 140 stores various types of information structured as the customer information that is collected about customers such as information regarding a visit history, a number of visits, an order history, and activity of the customer, social relationship information of a customer, and the like, under the control of the database control unit 150. In principle, the methods and apparatuses according to the exemplary embodiment of the present invention do not necessarily require a membership subscription procedure of a customer and therefore, when the customer information does not include the personal information of the customer such as name, address, telephone number, and the like, but the personal information of the customer is acquired by the membership subscription, stores/manages the personal information included in the customer information.

The customer information management unit 144 generally serves to acquire the customer information and analyze/process the obtained information. First, as described above, the customer information management unit 144 receives the customer terminal identification information, the table information identified based on the passwords for each table, and the customer terminal information including the access time that are transmitted from the access point 120 and extracts the customer information corresponding to the customer terminal identification information from the database 160 to update the activity information of the corresponding customer. For example, when the customer information management unit 144 is configured to record a visit history, a number of visits, and a recent visiting date as the activity information of the customer, the customer information management unit 144 adds a date corresponding to the access time of the customer terminal 110 to the visit history of the corresponding customer, increases the number of visits by one, and changes the recent visiting date to the date corresponding to the access time of the customer terminal 110. Again, this is only by way of example and therefore, it would be appreciated by those skilled in the art that various types of information may be stored, if necessary.

Meanwhile, the customer information management unit 144 may be configured to use the table information transmitted from the access point 120 so as to obtain the social information regarding the social relationship of the customer. A party of the customers visiting a shop may be classified into a kind of groups (friend group, colleague group, and the like) and therefore, the customer information management unit 144 using the classified group considers multiple customers accessing the access point 120 as one group by using the customer terminal 110 in the same table within a unit business time for the same table based on the received table information to set the group information. For example, if password 1111 is assigned to table 1 and password 2222 is assigned to table 2, when customers (customer terminals) A, D, and E use the password 1111 to access the access point 120, customers (customer terminals)

B and C use the password 2222 to access the access point 120 and the access point 120 identifies the table information of the customer terminals A, D, and E as table 1 and transmits the identified table information to the customer management server 140 and identifies the table information of the customer terminals B and C as table 2 and transmits the identified table information to the customer management server 140. In this case, the customer information management unit 144 sets the customer belonging to the same table, that is, the customers A, D, and E belonging to No. 1 table as the same one group (group A) to store the group information set as the group A in the customer information of each of the customers A, D, and E as the social information and sets the customers B and C belonging to No. 2 table as the same one group (group B) to store the group information set as the group B in the customer information of each of the customers B and C as the social information. In this case, the customer information management unit 144 may also be configured to store another customer information belonging to the corresponding group, together with the group information as the social information.

On the other hand, according to the exemplary embodiment configured to generate the passwords for each customer for accessing the access point 120 without being assigned to each table, since the password itself is information capable of identifying the customer group, the customer information management unit 144 may be configured to consider multiple customers who access the access point 120 as one group using the same password to set the group information.

In addition, the customer information management unit 144 according to the exemplary embodiment of the present invention may be configured to expand the group. That is, in the foregoing example, if the customer A has the group information set as group A as the social information in advance, when the customer A visits a shop together with customers F and G that do not have the additional group information, the customer information management unit 144 sets the customers F and G as the same group A as the customer A and stores the group information set as the group A in the customer information of the customers F and G as the social information, by referring to the social information of the customer A. Due to this configuration of the customer information management unit 144, the group information is accumulated over time and the groups are expanded accordingly, thereby establishing the efficient social network marketing strategy. In addition, the customer information management unit 144 uses the information belonging to group members belonging to the same group to analyze intimate relationship between the group members based on the accompanying number of times, the recent accompanying date and time, and the like, and may serve to provide events or guide information, and the like, accordingly. In addition, the social information of the customer is linked with social network services such as twitter, me2day, cyworld, facebook, and the like, so as to be used as the expansion of the group or the target marketing. That is, according to the demand of the customer, the customer receives the friend (acquaintance) information stored in the server operating the social network and is grouped together with the group belonging to the customer, thereby expanding the group, while the group information (information of the group members belonging to the group) of the customer stored in the database 160 is transmitted to the server operating the social network and is registered within the corresponding service as a friend, thereby implement the linking.

In addition, the customer information management unit 144 may be configured to expand the group by merging different groups. In particular, the customer information management unit 144 serves to analyze the customer information determined to be accessed in the same table to integrate different groups as one group when multiple customers having different group information are present and reset and store the group information of each customer as the integrated group. In the foregoing example, if the customer A has the group information set as the group A as the social information in advance and the customer B has the group information set as the group B as the social information in advance, when both customers A and B visit a shop later to access the access point 120 in the same table, the customer information management unit 144 integrates the group A belonging to the customer A and the group B belonging to the customer B as a single group C and resets the social information of all the customers belonging to the group A and the group B as the group C. Further, according to the configuration of the exemplary embodiment, the integration of the groups may also be performed so that one group is integrated into another group. For example, in the case of the exemplary embodiment configured so as to differentiate the absorption target group from the absorption group based on the number of group members, in the foregoing example, the group A has five group members and the group B has two group members and therefore, the customer information management unit 144 integrates the group B into the group A and resets the social information of all the customers belonging to the group B as the group A.

Further, as described above, the customer information management unit 144 may also be configured to generate/manage one-to-one personal connection information on the customers in addition to the social information in a group unit. Describing this in detail, the customer information management unit 144 may be classified to generate the personal connections for each customer by classifying/accumulating and storing the information of the customers determined to be the same group. For example, if the customer A visits a shop together with the customers B and C and uses the same password (for example, 1111) to access the access point 120, the customer information management unit 144 generates/stores the personal connections of the customer A based on the information regarding the customers B and C while classifying the customers A, B, and C into the same group, generates/stores the personal connections of the customer B based on the information on the customers A and C, and generates/stores the personal connections of the customer C based on the information on the customers B and C. Next, if the customer A again visits a shop together with the customer D and accesses the access point 120 by using the same password (for example, 2222), the customer management unit 144 additionally reflects the information on the customer D to update/store the personal connections of the previously generated customer A and generate/store the personal connections of the customer D based on the information on the customer A. In the example as described above, consequently, the personal connection information of the customer A that are generated/updated/stored by the customer information management unit 144 is included in the information on the customers B, C, and D and therefore, it can be appreciated that a person (friend or colleague) connected with the customer A is the customers B, C, and D. Similarly, the personal connection of the customer B includes the information on the customers A and C, the personal connection of the customer C includes the information on the customers B and C, the personal information of the customer D includes the information on the customer A, thereby identifying the personal information for each customer with which the corresponding customer enters into relationship.

Meanwhile, the customer may access the customer management server 140 using the customer terminal 110 and read its own customer information stored in the customer management server 140 and as described above, may use a function connected with the social network service to register the friend information in the customer management server 140 or upload the customer information belonging to its own group registered in the customer management server 140. In addition, the customer accesses the customer management server 140 by using the customer terminal 110 to read its own personal connection information generated/updated/stored as described above or upload its own personal connection information stored in the customer management server 140 to the connected social network service.

On the other hand, the customer information management unit 144 may be configured to receive the order information of the specific table transmitted from the POS terminal 130 and store the order information in the customer information determined to be accessed in the corresponding table. The order information of the customer may be configured so that the customer information (including the order history until now) on the corresponding customer from the customer management server 140 is transmitted to the shop manager terminal (not shown) and/or the POS terminal 130 based on the time when it is determined that the customer visits a shop, that is, the time when the customer terminal 110 accesses the access point 120 and is exposed to a business owner or a clerk. In this case, it is possible to expect effects such as recommendation of new menus to the customer visiting the shop and identification of the menu frequently ordered by the customer.

In addition, the customer information management unit 144 may be configured to receive the payer information on the specific table transmitted from the POS terminal 130 and/or the manager terminal and add and store the received payer information to the corresponding customer information. That is, if a shop is a restaurant, customers have finished eating and then, one person on behalf of a party of the customers pays for the meals and at the time of payment, a business owner or a clerk asks the payer to join a mileage card membership and when the payer consents to membership subscription to provide the personal information, the POS terminal 130 and/or the manager terminal transmits the payer information consented by the customer with the membership subscription and providing the personal information to the customer management server 140 and the customer information management unit 144 receiving the payer information matches the personal information with the customer information to extract the corresponding customer information and additionally store the personal information of the payer in the extracted customer information. Meanwhile, if most of the payers are a leader or the youngest of the party, they exerts considerable influence on decision making and therefore, when they are determined to be the payers, the customer information management unit 144 may be configured to assign a predetermined weight at the time of calculating the activity scores for the corresponding visit.

Meanwhile, the customer information management unit 144 may be configured to calculate the activity scores numerically representing the loyalty of customers based on the number of visits to the shop, frequency, and order history, a role within the group, and the like, of customers and use the calculated activity scores for marketing. The activity scores are operated by a method of calculating the activity scores for the corresponding visit every time the customers pay a visit to a shop, accumulating the calculated activity scores, and calculating a sum of activity scores. That is, the customer information management unit 144 performs calculation of the activity scores of each customer and store the calculated activity scores in the customer information based on the customer activity information determined to be accessed in the corresponding table after the payment for the specific table is completed and the received payer information. In calculating the activity scores, the method for calculating activity scores may be variously set by a method of assigning a higher weight to customers classified as a regular customer than normal customers and as described above, a higher weight to a payer than other parties. The method of calculating the activity scores may be variously changed if necessary, but it would be appreciated by those skilled in the art that the modifications and the changed examples are included in the scope of the present invention if they include a technical idea of the present invention.

More preferably, the customer information management unit 144 may be configured to select a group leader of the group members of the specific group based on the activity scores of the customers that have been calculated and accumulated as described above. Generally, the decision of the corresponding group is mainly made by the leader that spreads favorable opinions within a single friend and colleague group. Accordingly, when identifying a leader within the group, offering more benefits to the identified leader, and performing the marketing activity based on the leader, more efficient marketing can be performed. Therefore, the customer information management unit 144 according to the exemplary embodiment of the present invention is configured to select the leader of the group based on the sum of activity scores of all the customers belonging to the same group so as to perform the function and store the group leader information in the customer information of the selected leader. The leader information is transmitted to the manager terminal and/or the POS terminal as additional information of a type such as "No. 1 table, A customer (group leader) visiting, a customer accompanied by two strangers from the customer information management unit 144 when the leader of the group visiting a shop is identified later (when the customer terminal 110 of the group leader accesses the access point 120).

In addition, the customer information management unit 144 may be configured to perform a function of receiving the Internet usage information of the specific customer terminal 110 transmitted from the access point 120 and storing the received Internet usage information in the customer information corresponding to the customer terminal 110. The Internet usage information of the customer may be used as the basic information in managing the customer relationship and establishing the marketing strategy. For example, in establishing the Internet advertisement strategy, a site posting advertisement may be selected by referring to the Internet usage information of the stored customer and the event activity may be planned by being linked with the corresponding site. The customer management server 140 may be configured to perform the CRM tool capable of providing various analysis results based on the customer information so as to use the customer Internet usage information. In this case, the CRM tool may be installed in the customer management server 140 and may be operated by being linked with the database 160 and the customer information management unit 144.

In particular, the customer management server 140 may further include an event management unit 146 that digitally calculates the business value for a party visiting the shop and transmits the marketing information determined based on the calculated value to the shop manager terminal (not shown) and/or the POS terminal 130.

That is, the event management unit 146 calculates the customer index based on the number of customers who are determined to access the same table and the activity information (activity score) of the corresponding customer, determines whether the corresponding table corresponds to the event providing target table based on the calculated customer index, and if the corresponding table corresponds to the event providing target, sets appropriate events according to a preset algorithm and transmits the set events to the shop manager terminal and/or the POS terminal 130. For example, if four customers assigned to No. 1 table access the access point 120 using the customer terminal 110, the customer information management unit 144 uses the customer terminal information transmitted from the access point 120 to extract the customer information on the four consumers from the database 160. In this state, if one of the four customers is a regular customer having a high activity score and the remaining three customers are normal customers, the event management unit 146 calculates the customer index of No. 1 table by an operation of 'customer index*1 of regular customer+customer index*3 of normal customer'. When the customer index is graded and different events for each grade is provided, the event management unit 146 confirms a grade belonging to the calculated customer index and generates event information based on the grade, and transmits the generated event information to the manager terminal, and the like, thereby providing the marketing information. For example, if the customer index is 50 to 60 scores, when the customer index of the foregoing No. 1 table is between 50 and 60 if a 'a piece of cake service' event is set, the event management unit 146 generates the event information "give a piece of cake service to No. 1 table' and transmits the generated event information to the manager terminal, and the like, and may provide marketing solutions based on the customer index by allowing a shop manager or a clerk confirming the event information to give a piece of cake to No. 1 table as a service.

Meanwhile, the event management unit 146 according to the exemplary embodiment of the present invention may be configured to additionally refer to the activity information of the customers determined to be accessed in the same table to set whether there are an event and the event contents. For example, when a greeting event for a first visit is set, if all the customers accessed in No. 2 table correspond to the first visit, the event management unit 146 generates the event information 'all the customers of No. 2 table are the first visit and therefore, a clerk says hi to all the customers of No. 2 table' and transmits the generated event information to the manager terminal, and the like, thereby performing the customized marketing.

In particular, the customer management server 140 may further include the marketing management unit 148 that performs on-line marketing based on the stored customer information. The marketing management unit 148 selects the customer to whom online marketing is possible due to the existence of publically available information (e-mail address, social network service ID, telephone number, and the like) to perform the marketing activity using e-mail or a character/multi message, an event guide, coupon delivery, and the like. In performing the marketing activity, the marketing management unit 148 is more preferably configured to perform the distinguished marketing which targets the customer selected as a leader by a process of selecting a leader as described above. That is, the marketing management unit 148 may be configured to perform the leader-oriented marketing, such as an event holding notice, coupon delivery, and the like, on only the customer classified as the leader as a target.

Meanwhile, the customer management server 140 may further include the access point management unit 152 that accesses the access point 120 with the top administrator account, and manages the function setting of the access point, and monitors the related information such as the current access device information, and the like. As described above, according to the exemplary embodiment of periodically changing the passwords for each table in order to improve the security of the wireless network and preventing an unauthorized user from using the wireless network without permission, the access point management unit 152 determines whether the change time of the password is reached and changes the password of each table of the access point 120 if it is determined that the change time is reached and transmits the change log to the POS terminal 130 and the manager terminal. In addition, if the password guide for each table is made through the display unit included in the table, the access point management unit 152 guides the changed password for each table through the display unit.

In FIG. 2, the communication unit 142, the customer information management unit 144, the event management unit 146, the marketing management unit 148, the database control unit 150, the access point management unit 152, and the database 160 may be physically implemented in a single machine. Alternatively, some or all of them may be implemented in different machines. Also, there may be multiple physical machines in parallel which serve to perform a single same function. As described above, it would be appreciated by those skilled in the art that the present invention is not limited to the actual number and positions of machines in which each component is installed or databases and can be variously changed in design.

Example of Operation Process of Access Point

Figure 3:
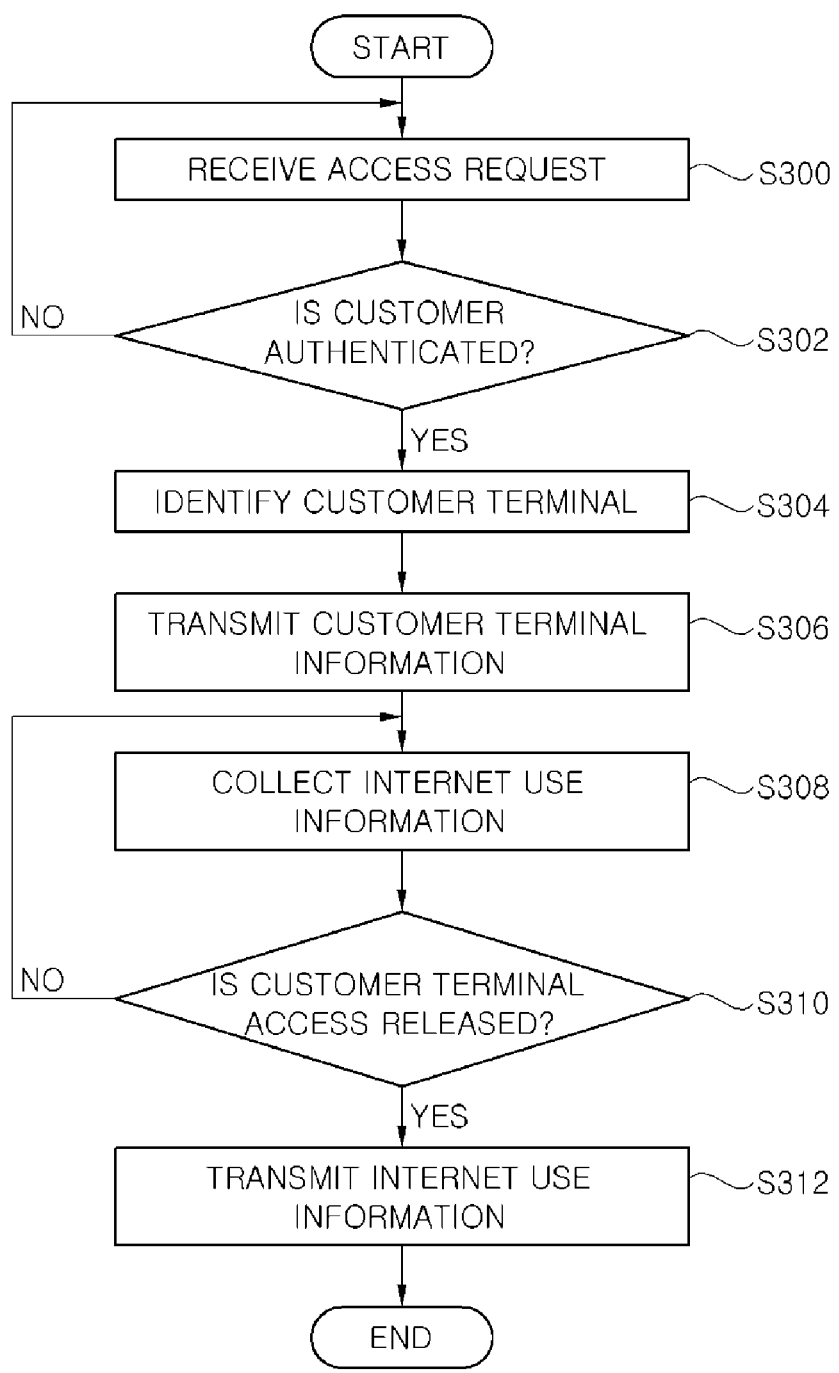
FIG. 3 is a flow chart showing a process of identifying customer terminals and a process of acquiring information performed at access points according to an exemplary embodiment of the present invention.

FIG. 3 is a flow chart showing a process of identifying customer terminals and a process of acquiring information performed at access points according to an exemplary embodiment of the present invention, and FIG. 5 is a diagram showing an example of acquiring information on customer terminals accessing access points according to the exemplary embodiment of the present invention. Hereinafter, an operation process of the access point 120 according to the exemplary embodiment of the present invention will be described in detail with reference to FIGS. 3 and 5.

First, the access point 120 maintains a state of broadcasting the SSID for the serviced wireless network. Further, in a certain embodiment, the broadcasting of the SSID may not be permitted, and the customer may access the access point 120 by directly inputting and selecting the SSID provided by the access point 120 within a shop through the customer terminal, and inputting the password. As described above, if the access point 120 supports the multi SSID, the access point 120 broadcasts the SSID for each table.

When requesting an access to the access point 120 by manipulating the customer terminal 110 after the customer enters a shop, is associated with the specific table, and guides the passwords for each table assigned to the table in which the customer is seated, the access point 120 receives the access request transmitted from the customer terminal (S300) and determines the validity of the password included in the access request (S302). If the received access password is not valid, the access point 120 transmits the guide information to the customer terminal 110 and prohibits the access. If the password is valid, the access point 120 performs a process of permitting the access of the customer terminal 110 and obtaining the information on the customer terminal.

If the customer terminal 110 is accessed in due course, the access point 120 identifies the table to which the customer terminal 110 belongs based on the password used at the time of the access of the customer terminal by referring to the password tables for each stored table while extracting the unique identification information of the customer terminal (S304) and generates the extracted customer terminal identification information and table information and the customer terminal information including the access time and transmits the generated information to the customer management server 140 (S306).

Referring to FIG. 5, an example of the customer terminal 110 information accessing the current access point 120 is shown. The accessed customer terminal 110 is represented by A, B, C, D, and E, respectively, which is for convenience of explanation. Actually, this is divided as the unique identification information such as the MAC address information of '00-06-97-8F-4F-86', and the like. The access point 120 identifies that the table to which the terminal A belongs is No. 1 table based on password '1111' used at the time of the access of the terminal A with respect to the terminal A and generates 'unique identification information (00-06-97-8F-XX-XX) of extracted terminal A', 'access time (19:00)', and 'table information (No. 1 table)' as the single customer terminal information and transmits the generated information to the customer management server 140. By the same method, the customer terminal information on the terminal B is configured as '00-06-97-8F-XX-XY', '19:10', and 'No. 2 table', the customer terminal information on the terminal C is configured as '00-06-97-8F-XX-YY', '19:30', and 'No. 2 table', the customer terminal information on the terminal D is configured as "00-06-97-8F-XY-XY', '19:45', and 'No. 1 table', and the customer terminal information on the terminal E is configured as '00-06-97-8F-YY-YY', '20:00', and 'No. 1 table' and they may be transmitted to the customer management server 140.

Meanwhile, after accessing the customer terminal 110 requesting the access, the access point 120 traces and monitors the Internet usage information of the accessed customer terminal 110 (S308) and when the access of the customer terminal 110 ends, transmits the monitored Internet usage information to the customer management server 140 (S310 and S312). As shown in FIG. 5, the terminal A visits the site 'www.aaa.com', 'www.bbb.co.kr' in the accessed state and therefore, the access point 120 determines whether the access of the terminal A ends and when the access ends, transmits the 'www.aaa.com, www.bbb.co.kr' to the customer management server 140 as the Internet usage information for the terminal A. Other access terminals B, C, D, and E transmit the Internet usage information on each terminal to the customer management server 140 through the same process.

Example of Operation Process of Customer Management Server

Figure 4:
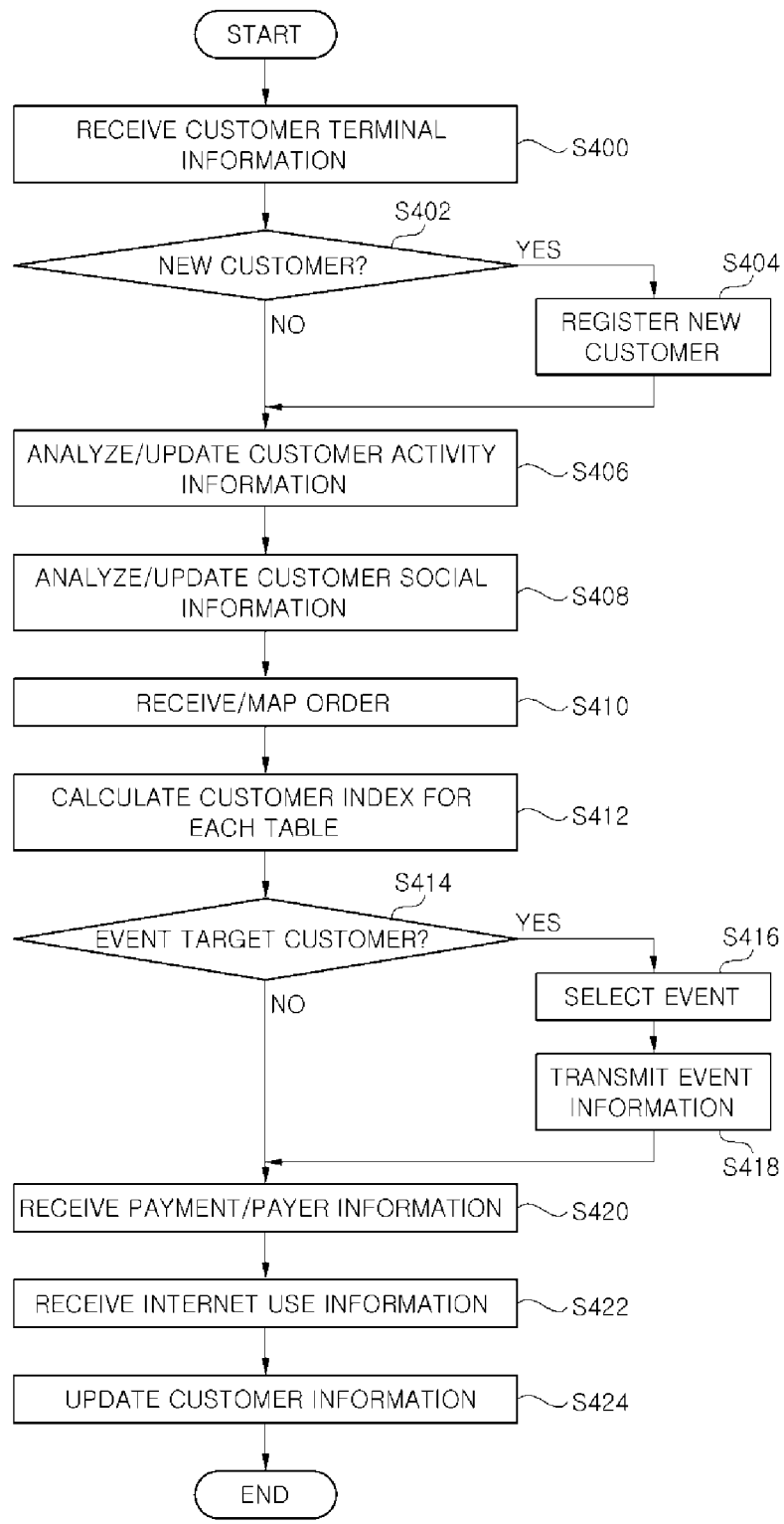
FIG. 4 is a flow chart showing a process of acquiring and managing customer information performed by the customer management server according to the exemplary embodiment of the present invention.

FIG. 4 is a flow chart showing a process of acquiring and managing customer information performed by the customer management server according to the exemplary embodiment of the present invention and FIG. 6 is a diagram exemplarily showing an example of customer information stored in the customer management server according to the exemplary embodiment of the present invention. Hereinafter, an operation process of the access point 120 will be described in detail with reference to FIGS. 4 and 6.

First, the customer management server 140 receives the customer terminal information transmitted from the access point and uses the received customer terminal identification information to read the corresponding customer information from the database 160 (S400). In this case, when the customer information corresponding to the received customer terminal identification information is not present in the database, the customer management server 140 determines the customer using the corresponding customer terminal as a new customer and registers it as the new customer (S402 and S404). Meanwhile, as described above, when the exemplary embodiment is configured to receive the customer telephone number at the access time of the access point 120 as described above, the customer management server 140 searches the corresponding customer information using both of the received customer telephone number (or subscriber information stored in a subscriber identification module (SIM) card) and the customer terminal identification information. When one of two information is mismatched, that is, when the telephone number is registered but the terminal identification information is different, the customer management server 140 changes the mismatching information so as to be matched, thereby correcting the customer information.

When the customer information corresponding to the customer terminal identification information is read, the customer management server 140 analyzes and updates the activity information in the read customer information (S406). For example, when the activity information of the customer is configured to record a visit history, a visiting frequency, and a recent visiting date, the customer management server 140 adds a date corresponding to the access time of the customer terminal 110 to the visit history of the corresponding customer, increases the visiting frequency once, and changes the recent visiting date to date corresponding to the access time of the customer terminal 110. That is, when the customer A visits a shop at 04. 20 when the activity information of the customer A read for the customer A shown in FIG. 6 is 'number of visits: 8 times' and 'recent visiting date: 04.15', the customer management server 140 reflects the latest visit of the customer A to change the activity information of the customer A to 'number of visits: nine times' and 'recent visiting date: 04. 20' and store the changed activity information as the customer information.

When the analysis and update of the activity information of the customer corresponding to the customer terminal 110 is completed, the customer management server 140 analyzes, sets, and updates the social information in the read customer information based on the received table information (S408). As described above, a party of customers visiting a shop may be classified into the same one group (friend group, colleague group, and the like) and therefore, the customer management server 140 using the classified group considers multiple customers accessing the access point 120 as one group by using the customer terminal 110 in the same table within a unit business time for the same table based on the received table information to set the group information.

In the example shown in FIG. 4, when the password 1111 is assigned to the table 1 and the password 2222 is assigned to the table 2, when the customers (customer terminals) A, D, and E access the access point 120 using the password 1111, the customers (customer terminals) B and C access the access point 120 using the password 2222, the customer management server 140 sets the customer belonging to the same table, that is, the customers A, D, and E belonging to No. 1 table as the single same group (group A) to set the group information set as the group A in the customer information of each of the customers A, D, and E as the social information and sets the customers B and C belonging to No. 2 table as the single same group (group B) to store the group information set as the group B in the customer information of each of the customers B and C as the social information, by referring to the table information of the customer terminal transmitted from the access point 120.

That is, in the foregoing S408, when the customer A has the group information set as group A as the social information in advance, when the customer A visits a shop together with customers F and G that do not have the additional group information, the customer management server 140 sets the customers F and G as the same group A as the customer A and stores the group information set as the group A in the customer information of the customers F and G as the social information, by referring to the social information of the customer A, thereby expanding the group. Further, in the foregoing S408, when the customer A has the group information set as the group A as the social information in advance and the customer B has the group information set as the group B as the social information in advance, when both of the customers A and B visit a shop later to access the access point 120 in the same table, the customer management server 140 integrates the group A belonging to the customer A and the group B belonging to the customer B as a single group C and resets the social information of all the customers belonging to the group A and the group B as the group C.

When the social information analysis, setting, and update of the customer is completed, the customer management server 140 receives the order information of the specific table transmitted from the POS terminal 130 to store the order information in the customer information of the customer who is determined to be accessed in the corresponding table (S410). The order information may be recorded in various ways according to the exemplary embodiment of the present invention. FIG. 6 illustrates an exemplary embodiment configured to store the information on how frequently the specific customer is ordered to the menu provided within a shop. As shown in FIG. 6, the customer A order "menu 1" once, 'menu 2' five times, 'menu 3' twice, and 'menu 4' three times as a result of integrating all the visits of the customer A up to now and therefore, it can be appreciated that a favorite menu of the customer A is the 'menu 2' and a less favorite menu is the 'menu 1'. Therefore, when it is identified that the customer A visits a shop, the customer management server 140 transmits the order information of the customer A to the POS terminal 130 and uses the order information as the reference information providing services.

After the mapping of the order information (the order information may be generated before the mapping), the customer management server 140 calculates the customer index based on the number of customers determined to be accessed in the same table and the activity information (activity score) of the corresponding customer (S412). As described above, the customer index numerically represents the business value included in the customers of the table to be calculated and the customer management server 140 determines the marketing solution based on the calculated customer index and transmits the determined marketing solution to the POS terminal 130 (S414, S416, and S418). In the example shown in FIG. 6, in the case of No. 1 table, three customers A, D, and E visit a shop and the activity score of the customer A is high and thus, the higher customer index than No. 2 table visited by two customers B and C is calculated. Therefore, there is a need to provide higher quality of services to No. 1 table than to No. 2 table and the customer management server 140 generates the event information on each of the tables based on the calculated customer index and transmits the generated event information to the POS terminal 130, and the like, thereby providing the marketing solution according to the business value.

The customer management server 140 receives the payment information on the specific table and the payer information transmitted from the POS terminal 130 and adds and stores the received payer information to the corresponding customer information (S420). As described above, for the customer identified as the payer, the customer management server 140 assigns the weight at the time of calculating the activity score of the corresponding visiting.

The customer management server 140 receives the Internet usage information of the specific customer terminal 110 transmitted from the access point 120 and stores the received Internet usage information in the customer information corresponding to the customer terminal 110 (S422). The S422 may be performed at the same time or different time as or from the foregoing S420 and therefore, is independent from the S420 and is not necessarily limited as being performed after S420. That is, the access ending of the customer terminal 110 may be made before the payment based on the manipulation of the customer and it is determined whether the Internet usage information transmission event of the access point 120 is only generated according to whether the access of the customer terminal 110 ends and therefore, the performance of both steps is independent.

Finally, the customer management server 140 calculates the activity score for each of the customer belonging to the corresponding table after payment is completed and stores the calculated activity score in the customer information (S424).

Meanwhile, a configuration of the customer information according to the exemplary embodiment of the present invention will be described with reference to FIG. 6. As shown in FIG. 6, the customer information according to the exemplary embodiment of the present invention may include 'customer field', 'activity information field', 'social information field', 'order information field', 'Internet usage information field', and 'activity index field'. The 'customer field' stores a unique identifier capable of identifying the customers and may store the unique identification information of the customer terminal and/or the customer telephone number as they are and may also store the unique identifiers for each customer assigned from the management server 140 accordingly. The 'activity information field' may store information such as the visit history, the number of visits, the recent visiting date, and the like, as the activity information of the customer and the 'social information field' may store the group information of the corresponding customer, the group member information belonging to the group, the group leader information, and the like. In addition, the 'order information field' may store overall order situation of the corresponding customer, the recent order content, and the like, and the 'Internet usage information field' may store information such as an Internet usage history of the customer terminal 110, whether the customer visits a specific site and the number of visits of the customer, a site to which the customer is frequently visited, and the like. The 'activity index field' stores a sum of accumulated activity score of the corresponding customer and uses the activity score stored in the activity index field to perform the selection or replacement of the leader of the group. Meanwhile, although not shown, when the customer is subscribed as the mileage card membership, the personal information of the input member is structured and stored in each of the fields.

The exemplary embodiments of the present invention are implemented in program command types performed by various computer means and may be recorded in a computer readable medium. The computer readable medium may include program commands, data fields, a data structure, and the like, alone or a combination thereof. The program commands recorded in the medium is specially designed and configured for the present invention or may be used by being known to those skilled in the art of computer software. An example of the computer readable recording medium may include magnetic media such as hard disk, floppy disk, magnetic tape, and the like, optical media such as CD-ROM, DVD, and the like, magneto-optical media such as floptical disk, and hardware devices specially configured to store and perform program commands such as ROM, RAM, flash memory, and the like. An example of the program commands may include a machine language code made by a compiler and a high-level language code executable by a computer using an interprinter, and the like. The above-mentioned hardware devices may be configured to be operated as at least one software module so as to perform an operation of the present invention, and vice versa.

As described above, the present invention is described with reference to specific matters such as the detailed components and the limited exemplary embodiments, but is provided to help a general understanding of the present invention. Therefore, the present invention is not limited to the above exemplary embodiments and can be variously changed and modified from the description by a person skilled in the art to which the present invention pertain.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

What is claimed is:

1. A method for collecting data by a data collection server from a plurality of communication terminals within a predefined physical area, the plurality of communication terminals being portable and being capable of establishing wireless communication with a wireless local area network (wireless LAN) provided by a wireless access point device, the method comprising:

providing a predetermined customer group identification information for establishing communication with the wireless LAN through the wireless access point device, to at least one communication terminal in the predefined physical area, the wireless access point device being wirelessly accessible to the at least one communication terminal within the predefined physical area, the predetermined customer group identification information comprising a valid password;

wirelessly receiving, by a control unit of the wireless access point device, the predetermined customer group identification information from the at least one communication terminal requesting access to the wireless LAN for accessing the Internet by the at least one communication terminal via the wireless access point device, wherein the wireless access point device is disposed between the at least one communication terminal and the Internet;

authenticating, by the control unit of the wireless access point device, the at least one communication terminal for accessing the wireless LAN using at least the valid password, wherein said authenticating comprises:

granting access to the Internet to the at least one communication terminal via the wireless access point device by comparing the valid password and a plurality of preset passwords that includes the valid password; and wirelessly delivering, by the wireless access point device, data from the Internet via the wireless LAN to the at least one communication terminal, wherein said data comprises data from at least one web site accessed by the at least one communication terminal while the access to the Internet is granted;

receiving, by the data collection server from the control unit of the wireless access point device, communication terminal information comprising communication terminal identification information and the predetermined customer group identification information collected by the wireless access point device from the at least one communication terminal within the predefined physical area; and setting, by the data collection server, the at least one communication terminal in a same customer group among a plurality of customer groups when the at least one communication terminal enters a same valid password to access the Internet via the wireless LAN as at least one other communication terminal in the same customer group and storing, on a storage device of the data collection server, the same customer group in customer information corresponding to the at least one communication terminal as customer social information, wherein the data collection server further receives an access time information of the at least one communication terminal;

wherein the plurality of preset passwords correspond to tables in a shop by one-to-one.

2. The method of claim 1, wherein the valid password corresponds to table information, and the at least one communication terminal having a same table information and the access time information within a unit business time are set as the same customer group.

3. The method of claim 1, wherein the same customer group is stored in customer information of other communication terminals as customer social information of the other communication terminals when the other communication terminals are in the predetermined physical area with the at least one communication terminal after the same customer group has been set.

4. The method of claim 3, wherein when communication terminals having a plurality of different previously set groups as customer social information in customer information of corresponding communication terminals are present, the plurality of differently previously set groups are integrated as a single group and the integrated group is used as customer social information.

5. The method of claim 1, further comprising:

extracting and updating activity information from the customer information of the at least one communication terminal and when there is no customer information, generating the customer information as a new customer.

6. The method of claim 1, further comprising: receiving order information of the same customer group transmitted from a point of sale (POS) terminal and storing the received order information in the customer information of the at least one same communication terminal included in the same customer group.

7. The method of claim 1, further comprising:
calculating a customer index for the same customer group by using the customer information of the at least one communication terminal included in the same customer group; and
determining whether an event is provided to the same customer group based on the calculated customer index;
generating, in response to the determination that the same customer group corresponds to the event providing target, event information based on the customer index and the customer information of the at least one communication terminal included in the same customer group; and
transmitting the generated event information to a point of sale (POS) terminal.

8. The method of claim 7, wherein the customer index is calculated based on a number of the at least one communication terminal included in the same customer group and customer activity information in the customer information of the at least one communication terminal.

9. The method of claim 1, further comprising:
receiving payer information of the same customer group and storing the received payer information in the customer information of the corresponding communication terminals.

10. The method of claim 9, further comprising:
after payment of the same customer group is completed, calculating activity scores of each customer based on customer activity information in the customer information of the at least one communication terminal included in the same customer group and the received payer information and storing the calculated activity scores in the customer information of the corresponding communication terminals.

11. The method of claim 10, further comprising: selecting a leader of the same customer group based on a sum of the activity scores of the at least one communication terminal included in the same customer group and storing group leader information in the customer information of the communication terminal of the selected leader.

12. The method of claim 1, further comprising:
receiving Internet usage information of the at least one communication terminal transmitted from the wireless access point device during said wirelessly delivering and storing the received Internet usage information in the customer information of the corresponding at least one communication terminal.

13. The method of claim 1, wherein the wireless access point device is configured to use a multi service set identifier (SSID) function to provide separate wireless networks, each of the separate wireless networks being associated with a different table within the predefined physical area.

14. A data collection server for collecting data from a plurality of communication terminals within a predefined physical area, the plurality of communication terminals being portable and being capable of establishing wireless communication with a wireless local area network (wireless LAN) provided by a wireless access point device, said server comprising:
a storage device; and
a customer information management unit configured to receive, from a control unit of the wireless access point device, communication terminal information comprising communication terminal identification information and a predetermined customer group identification information comprising a valid password collected by the control unit of the wireless access point device from at least one communication terminal within the predefined physical area, set the at least one communication terminal in a same customer group among a plurality of customer groups when the at least one communication terminal enters a same valid password as at least one other communication terminal in the same customer group to access the Internet via a wireless LAN, and store on the storage device the same customer group in customer information corresponding to the at least one communication terminal as customer social information, the wireless access point device being wirelessly accessible to the at least one communication terminal within the predefined physical area, the wireless access point device being disposed between the at least one communication terminal and the Internet,
wherein the predetermined customer group identification information for establishing wireless communication with the wireless LAN through the wireless access point device is provided to the at least one communication terminal in the predefined physical area prior to the customer information management unit receiving the communication terminal information from the wireless access point device, the control unit of the wireless access point device being configured to wirelessly receive the predetermined customer group identification information from the at least one communication terminal requesting access to the wireless LAN for accessing the Internet by the at least one communication terminal via the wireless access point device and transmit the predetermined customer group identification information to the customer information management unit, and
the wireless access point device being configured to authenticate the at least one communication terminal for accessing the wireless LAN using at least the valid password and to wirelessly deliver data from the wireless LAN to the at least one communication terminal;
wherein said authenticating comprises:
granting access to the Internet to the at least one communication terminal via the wireless access point device by comparing the valid password and a plurality of preset passwords that includes the valid password;
wherein said wirelessly delivering data comprises the wireless access point device wirelessly delivering data to the at least one communication terminal, wherein said data comprises data from at least one web site accessed by the at least one communication terminal while the access to the Internet is granted;
wherein the customer information management unit further receives an access time information of the at least one communication terminal;
wherein the plurality of preset passwords correspond to tables in a shop by one-to-one.

15. The data collection server of claim 14, wherein the customer information management unit is configured to store the same customer group in the customer information of other communication terminals as customer social information of the other communication terminals when the other communication terminals are in the predetermined physical area with the at least one communication terminal after the same customer group has been set.

16. The data collection server of claim 14, wherein the customer information management unit is configured to receive order information of the same customer group transmitted from a POS terminal and store the received order information in the customer information of the at least one communication terminal included in the same customer group.

17. The data collection server of claim 14, further comprising:
an event management unit configured to calculate a customer index for the same customer group by using the customer information of the at least one communication terminal included in the same customer group and determine whether an event is provided to the same customer group based on the calculated customer index.

18. The data collection server of claim 17, wherein the event management unit is configured to generate event information based on the customer index and the customer information of the at least one communication terminal included in the same customer group and transmit the generated event information to a POS terminal.

19. The data collection server of claim 14, wherein the customer information management unit is configured to receive payer information of the same customer group transmitted from a POS terminal and store the received payer information in the customer information of the corresponding at least one communication terminal.

20. A non-transitory computer-readable medium comprising an executable program which, when executed, performs a method for collecting data from a plurality of communication terminals within a predefined physical area, the plurality of communication terminals being portable and being capable of establishing wireless communication with a wireless local area network (wireless LAN) provided by a wireless access point device, the method comprising:
providing a predetermined customer group identification information for establishing communication with the wireless LAN through the wireless access point device, to at least one communication terminal in the predefined physical area, the wireless access point device being wirelessly accessible to the at least one communication terminal within the predefined physical area, the predetermined customer group identification information comprising a valid password;
wirelessly receiving, by a control unit of the wireless access point device, the predetermined customer group identification information from the at least one communication terminal requesting access to the wireless LAN for accessing the Internet by the at least one communication terminal via the wireless access point device, wherein the wireless access point device is disposed between the at least one communication terminal and the Internet;
authenticating, by the control unit of the wireless access point device, the at least one communication terminal for accessing the wireless LAN using at least the valid password, wherein said authenticating comprises:
granting access to the Internet to the at least one communication terminal via the wireless access point device by comparing the valid password and a plurality of preset passwords that includes the valid password; and
wirelessly delivering, by the wireless access point device, data from the Internet via the wireless LAN to the at least one communication terminal, wherein said data comprises data from at least one web site accessed by the at least one communication terminal while the access to the Internet is granted;
receiving, from the control unit of the wireless access point device, communication terminal information comprising communication terminal identification information and the predetermined customer group identification information collected by the wireless access point device from the at least one communication terminal within the predefined physical area; and
setting the at least one communication terminal in a same customer group among a plurality of customer groups when the at least one communication terminal enters a same valid password to access the Internet via the wireless LAN as at least one other communication terminal in the same customer group and storing the same customer group in customer information corresponding to the at least one communication terminal as customer social information, wherein the communication terminal information further comprises an access time information of the at least one communication terminal;
wherein the plurality of preset passwords correspond to tables in a shop by one-to-one.

\* \* \* \* \*